(12) United States Patent
Carr et al.

(10) Patent No.: US 8,799,003 B2
(45) Date of Patent: Aug. 5, 2014

(54) DYNAMIC BINDING OF PRINCIPAL SERVICES IN A CROSS-ENTERPRISE BUSINESS PROCESS MANAGEMENT SYSTEM

(75) Inventors: Derek W. Carr, Fairless Hills, PA (US); Peter P. Eacmen, West Roxbury, MA (US); Ronny A. Pena, New York, NY (US); Ajamu A. Wesley, Concord, MA (US)

(73) Assignee: International Business Machines Corporation, Armonk, NY (US)

( * ) Notice: Subject to any disclaimer, the term of this patent is extended or adjusted under 35 U.S.C. 154(b) by 3956 days.

(21) Appl. No.: 10/848,322

(22) Filed: May 18, 2004

(65) Prior Publication Data

US 2006/0004783 A1    Jan. 5, 2006

(51) Int. Cl.
*H04W 28/12* (2009.01)
*G06Q 10/10* (2012.01)

(52) U.S. Cl.
CPC ................................ *G06Q 10/10* (2013.01)
USPC .................................. 705/1; 705/0.01; 707/1

(58) Field of Classification Search
USPC ........................................ 705/1, 0.001; 707/1
See application file for complete search history.

(56) References Cited

U.S. PATENT DOCUMENTS

| | | | |
|---|---|---|---|
| 5,999,908 | A | 12/1999 | Abelow |
| 6,044,224 | A | 3/2000 | Radia et al. |
| 6,298,481 | B1 | 10/2001 | Kosaka et al. |
| 6,418,400 | B1 | 7/2002 | Webber |
| 6,493,714 | B1 | 12/2002 | Beaven et al. |
| 6,601,234 | B1 | 7/2003 | Bowman-Amuah |
| 2001/0047279 | A1 | 11/2001 | Gargone |
| 2001/0056504 | A1 | 12/2001 | Kuznetsov |
| 2002/0100028 | A1 | 7/2002 | Kosaka et al. |
| 2002/0107864 | A1 | 8/2002 | Battas et al. |
| 2002/0107957 | A1 | 8/2002 | Zargham et al. |
| 2002/0112182 | A1 | 8/2002 | Chang et al. |
| 2002/0174126 | A1 | 11/2002 | Britton et al. |
| 2003/0004746 | A1 | 1/2003 | Kheirolomoom et al. |

(Continued)

FOREIGN PATENT DOCUMENTS

WO    WO 01/15042 A2    3/2001

OTHER PUBLICATIONS

F Leymann, et al; "Web services and business process management", IBM systems journal 41(2), 2002.*

(Continued)

*Primary Examiner* — Lynda Jasmin
*Assistant Examiner* — Kimberly Evans
(74) *Attorney, Agent, or Firm* — Cuenot, Forsythe & Kim, LLC

(57) ABSTRACT

The present invention is a method, system and apparatus for dynamically binding principal services to activities in a business process in a cross-enterprise business process management system. In a preferred aspect of the invention, the system can include a business process specification document processing engine configured to process business process specification documents in which each of the documents defines a business process. A deployment service can be coupled to the engine and programmed to generate and deploy partner link instances for corresponding partner links specified in the documents. Finally, a link base authority can be configured to notify each partner link instance when an endpoint reference to a principal service has changed. Notably, the business process specification documents can include BPEL documents. As such, the business process specification document processing engine can include a BPEL4WS run-time engine.

10 Claims, 4 Drawing Sheets

(56) References Cited

U.S. PATENT DOCUMENTS

| | | | |
|---|---|---|---|
| 2003/0028451 A1 | 2/2003 | Ananian | |
| 2003/0050936 A1 | 3/2003 | Wainwright | |
| 2003/0093500 A1 | 5/2003 | Khodabakchian et al. | |
| 2003/0133552 A1 | 7/2003 | Pillai et al. | |

OTHER PUBLICATIONS

M Kloppmann, et al: "Business process choreography in WebSphere", combining the power of BPEL and J2EE IBM Systems Journal 43(2), 2004.*

BEA Systems, International Business Machines Corporation, Miscrosoft Corporation, SAP AG, Siebel Systems, Copyright 2002.*

Vivero, Julio et. al., *The Fain Management Framework a Management Approach for Active Network Environments*, 0-7803-7533-5/02 Copyright © 2002 IEEE.

Tsarouchis, Christos et al., *A Policy-Based Management Architecture for Active and Programmable Networks*, IEEE Network, May/Jun. 2003 0890-8044/03, Copyright © 2003 IEEE.

Medjahed, Brahim et al., *Business-to-Business Interactions: Issues and Enabling Technologies*, The VLDB Journal (2003), 12:59-85, Digital Object Identifier (DOI).

Bussler, Christoph, *Modeling and Executing Semantic B2B Integration*, Engineering e-Commerce/e-Business Systems (RIDE'02), Copyright © 2002 IEEE.

Teufel, Stephanie, et al., *Bridging Information Technology and Business—Some Modeling Aspects*, SIGOIS Bulletin, Aug. 1995/vol. 16, No. 1.

Narendra, N.C., *Adaptive Workflow Management—An Integrated Approach and System Architecture*, ACM 1-58113-239/500/003 © 2000.

Nance, William D. *Growing Pains—and Success—in Transforming the Information Systems Organization for Client/Server Development*, Computer Personnel © Jan. 1995.

Yoder, Joseph W. *Architecture and Design of Adaptive Object-Models*, ACM 1-58113-239/500/003 © 2000.

Cline, Marshall *Enduring Business Themes*, Communications of the ACM © May 2000.

Okonski, Zbigniew, *Enterprise Transforming Initiatives*—IEEE Power & Energy Magazine © 2003.

Premore, Brian J., *Transformation of ns TCP Models to TeD*—Parallel Simulation © 1997.

\* cited by examiner

DYNAMIC BINDING OF PRINCIPAL SERVICES IN A CROSS-ENTERPRISE BUSINESS PROCESS MANAGEMENT SYSTEM

BACKGROUND OF THE INVENTION

1. Statement of the Technical Field

The present invention relates to the field of computerized business-to-business interactions and more particularly to integrating cross enterprise business processes.

2. Description of the Related Art

The achievement of universal interoperability between applications by using Web standards remains the principal goal of Web Services. Web Services use a loosely coupled integration model to allow flexible integration of heterogeneous systems in a variety of domains including business-to-consumer, business-to-business and enterprise application integration. The following basic specifications originally defined the Web Services space: the Simple Object Access Protocol (SOAP), the Web Services Description Language (WSDL), and Universal Description, Discovery, and Integration (UDDI). SOAP defines an XML messaging protocol for basic service interoperability. WSDL introduces a common grammar for describing services. UDDI provides the infrastructure required to publish and discover services in a systematic way. Together, these specifications allow applications to find each other and interact following a loosely coupled, platform-independent model.

Presently, the interaction model that is directly supported by WSDL essentially can be viewed as a stateless model of synchronous or uncorrelated asynchronous interactions. Models for business interactions typically assume sequences of peer-to-peer message exchanges, both synchronous and asynchronous, within stateful, long-running interactions involving two or more parties. Nevertheless, systems integration requires more than the mere ability to conduct simple interactions by using standard protocols. The full potential of Web Services as an integration platform will be achieved only when applications and business processes are able to integrate their complex interactions by using a standard process integration model.

The Business Process Execution Language for Web Services (BPEL4WS) fulfills some aspects of a standard process integration model. The BPEL4WS specification defines a technology for integrating cross-enterprise business processes. By coordinating stateful interactions of loosely coupled services across enterprise boundaries, the BPEL4WS technology provides a means of modeling the interactions between an enterprise and its business partners, suppliers and customers and thus the value chain of the enterprise. More particularly, BPEL4WS defines a notation for specifying business process behavior based on Web Services.

In accordance with the BPEL4WS notation, business processes export and import functionality by using Web Service interfaces exclusively. Business processes can be described in two ways. First, executable business processes model the actual behavior of a participant in a business interaction. Business protocols, by comparison, use process descriptions that specify the mutually visible message exchange behavior of each of the parties involved in the protocol without revealing their internal behavior. Notably, the process descriptions for business protocols often are referred to as abstract processes. In any case, the BPEL4WS specification can be used to model the behavior of both executable and abstract processes.

BPEL4WS provides a language for the formal specification of business processes and business interaction protocols. By doing so, BPEL4WS extends the Web Services interaction model and enables the model to support business transactions. The basic concepts of BPEL4WS can be applied in one of two ways. A BPEL4WS process can define a business protocol role, using the notion of an abstract process. The relationship between two or more roles can be modeled as a partner link. It is also possible to use BPEL4WS to define an executable business process. In an executable business process, the logic and state of the process determine the nature and sequence of the Web Service interactions conducted at each business partner, and thus the interaction protocols.

Importantly, where private implementation aspects of a business process use platform-dependent functionality, which is likely in many if not most realistic cases, the continuity of the basic conceptual model between abstract and executable processes in BPEL4WS makes it possible to export and import the public aspects embodied in business protocols as process or role templates while maintaining the intent and structure of the protocols. This is arguably the most attractive prospect for the use of BPEL4WS from the viewpoint of unlocking the potential of Web Services. Specifically, BPEL4WS allows the development of tools and other technologies that greatly increase the level of automation and thereby lower the cost in establishing cross-enterprise automated business processes.

Notwithstanding, BPEL4WS can be limited to the static deployment of selected business processes. In fact, whereas BPEL4WS provides for a statically specified principal supporting service for each activity defined in a deployed process, BPEL4WS does not permit the dynamic specification of a new principal service for an activity defined in a deployed process. The modern, on-demand computing vision, however, demands that the enterprise support a level of business transformation which is informed by timely and relevant business insights. Consequently, comprehensive business transformations require not only the modification of executable business processes, but also the adaptation of partner, supplier and customer interactions modeled by BPEL4WS as business protocols, or abstract processes.

SUMMARY OF THE INVENTION

The present invention addresses the deficiencies of the art in respect to cross-enterprise business process interaction and provides a novel and non-obvious method, system and apparatus for dynamically binding principal services to activities in a business process in a cross-enterprise business process management system. In a preferred aspect of the invention, the system can include a business process specification document processing engine configured to process business process specification documents in which each of the documents defines a business process. A deployment service can be coupled to the engine and programmed to generate and deploy partner link instances for corresponding partner links specified in the documents. Finally, a link base authority can be configured to notify each partner link instance when an endpoint reference to a principal service has changed.

Notably, the business process specification documents can include BPEL documents. As such, the business process specification document processing engine can include a BPEL4WS run-time engine. In a preferred aspect of the invention, the business process can include a sequence of business activities embodied within corresponding Web services. Consequently, each of the partner link instances can include a Web service encapsulating a partner link instance.

Each of the Web services encapsulating a partner link instance further can act as a proxy to a corresponding principal service.

A method for dynamically binding principal services to partner links in a cross-enterprise business process management system can include the step of deploying a partner link instance for each partner link specified in a business process specification document. The method also can include the step of re-factoring the document to bind each the partner link to each deployed partner link instance in lieu of a direct binding to a principal service. An event handler can be added to the business process specification document to handle a dynamic change to an endpoint reference to the principal service. Finally, each of the partner link instances can be registered to receive notification of a change to an endpoint reference to a principal service.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for dynamically binding partner links to end point references in a cross-enterprise business process management system. In accordance with the present invention, principal services supporting corresponding business process activities in a business process sequence can be dynamically substituted with other business process activities subsequent to the deployment of the business process. Within the business process defining document, a partner link can be disposed to process service requests supported by the principal service. An endpoint reference to the principal service in the partner link can vary, however, once the business process has been deployed. Consequently, different principal services can alternately support service requests even once the business process has been deployed merely by changing the endpoint reference in the partner link.

Figure 1:
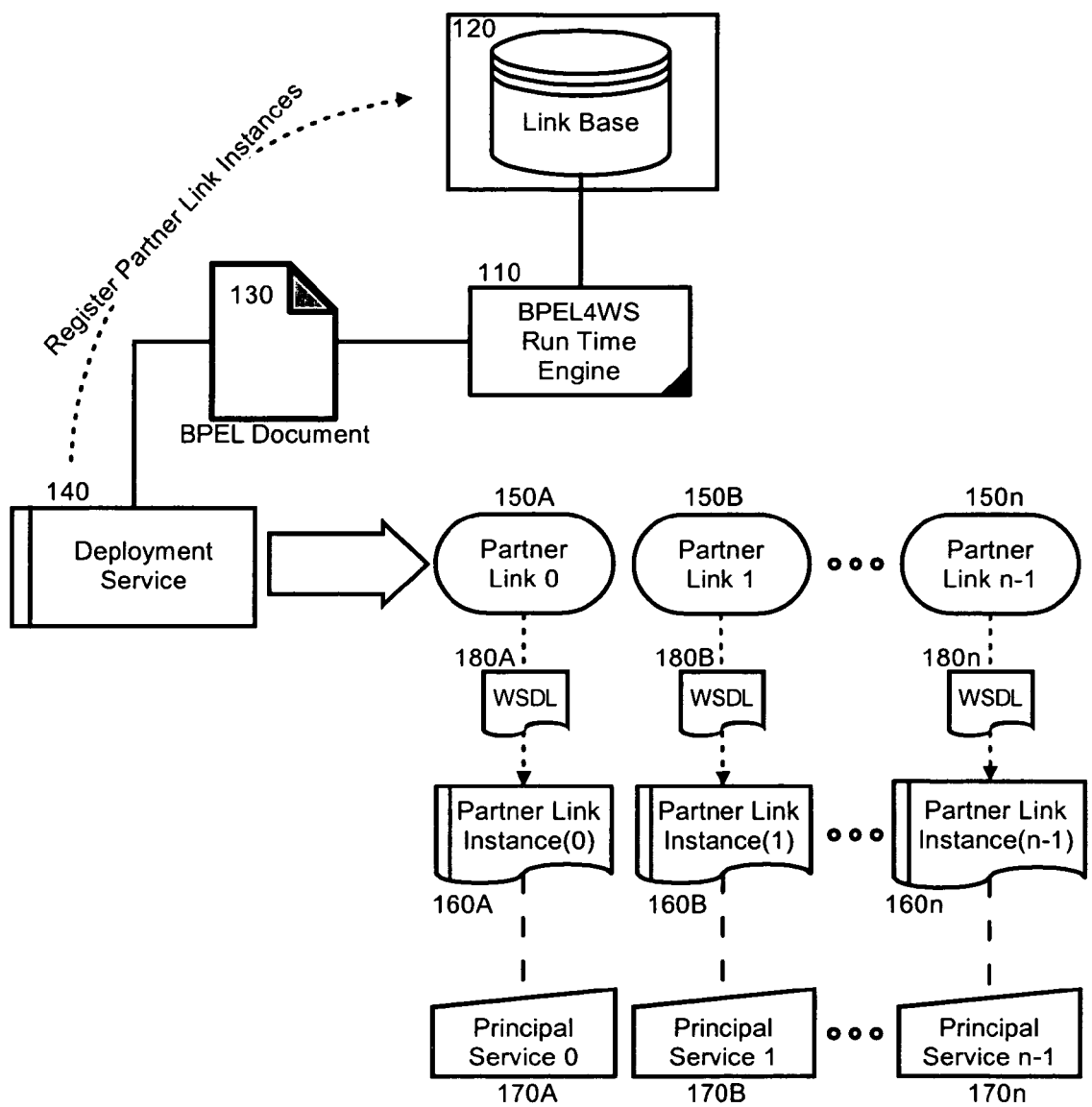
FIG. 1 is a schematic illustration of a cross-enterprise business process interaction system which has been configured for dynamic binding of partner links to endpoint services in accordance with the inventive arrangements.

FIG. 1 is a schematic illustration of a cross-enterprise business process interaction system which has been configured for dynamic binding of partner links to endpoint services in accordance with the inventive arrangements. The system can include a business process specification document processing engine configured to process business process specification documents. Business process specification documents are documents—typically markup language documents—which define the sequence of a business process. Typically associated with Web services, the business process specification documents also include information regarding the location and addressability of Web services programmed to implement activities in the sequence of the business process.

In a preferred aspect of the invention, the business process specification document processing engine can be a business process execution language (BPEL) run-time engine 110. As such, the BPEL run-time engine 110 can be configured to process a BPEL conforming document 130 by deploying Web services to support the activities of the business process defined within the BPEL document 130. In this regard, the BPEL run-time engine 110 can process a sequence of defined activities in the BPEL document 130 to identify a workflow of activities in the BPEL document 130, and also a set of messages responsive to which the BPEL run-time engine 110 can manage the invocation of selected ones of the deployed Web services. As an example, the BPEL run-time engine 110 can be a BPEL run-time engine configured to process BPEL4WS compliant documents.

A deployment service 140 can be coupled to the BPEL run-time engine 110. The deployment service 140 can be configured to re-factor artifacts associated the BPEL document 130, including for example, the BPEL document 130 itself in addition to corresponding WSDL documents. A link base authority 120 can be communicatively linked to the deployment service 140. The link base authority 120 can be a Web service programmed to manage an XLink link base document. The link base document can serve as a registry for all information related to the business process described in the BPEL document 130. Importantly, the BPEL run-time engine 110 can be configured with an XLink interpreter (not shown) to process Xlinks in the link base authority 120.

One or more partner links 150A, 150B, 150n can be defined within the BPEL document 130, each of the partner links 150A, 150B, 150n representing a role in the business process described within the BPEL document 130. For each defined partner link 150A, 150B, 150n, a corresponding partner link instance 160A, 160B, 160n can be created as a Web service along with a WSDL document 180A, 180B, 180n. The partner link instances 160A, 160B, 160n can embody the role of corresponding partner links 150A, 150B, 150n defined within the BPEL document 130. Each of the partner link instances 160A, 160B, 160n further can include a specification of an endpoint address for a principal service 170A, 170B, 170n designated to support the role associated with a corresponding one of the partner links 150A, 150B, 150n.

In operation, when deploying a new business process defined by the BPEL document 130, the deployment service 140 can generate partner link instances 160A, 160B, 160n for each partner link 150A, 150B, 150n defined in the BPEL document 130. In particular, each of the partner link instances 160A, 160B, 160n can be created based upon a corresponding WSDL document 180A, 180B, 180n provided to the deployment service 140 in association with the BPEL document 130. Notably, each of the partner link instances 160A, 160B, 160n can include a skeletal structure acting as an interface to the underlying ones of the principal services 170A, 170B, 170n. When bound and deployed as a Web service, each of the partner link instances 160A, 160B, 160n thus can act as a proxy for corresponding ones of the principal services 170A, 170B, 170n.

The deployment service 140, having created the partner link instances 160A, 160B, 160n can register each of the partner link instances 160A, 160B, 160n with the link base authority 120. In this way, any one of the partner link instances 160A, 160B, 160n can be notified when an endpoint reference to a corresponding one of the principal services 170A, 170B, 170n has changed. Once the partner link instances 160A, 160B, 160n have been registered with the link base authority, the BPEL document 130 and its corresponding WSDL document (not shown) can be refactored so that the partner link instances 160A, 160B, 160n are utilized in lieu of a direct utilization of the principal services 170A, 170B, 170n. Specifically, the WSDL documents 180A, 180B, 180n for each partner link 150A, 150B, 150n can be modified to point to the newly deployed partner link instances 160A, 160B, 160n.

Within the BPEL document 130 itself, an event handler can be added for updating the endpoint reference information of the partner link instances 160A, 160B, 160n. The WSDL document (not shown) for the BPEL document 130 also can be updated to reflect the addition of the event handler. In any case, once the BPEL document 130 and the companion WSDL document (not shown) have been re-factored, one or more XLinks for the business can be registered with the link base authority 120. In this regard, each XLink can bind a partner link 150A, 150B, 150n to a principal service 170A, 170B, 170n by way of the partner link instances 160A, 160B, 160n. Finally, the refactored BPEL document 130 and the companion WSDL document (not shown) can be deployed along with the WSDL documents 180A, 180B, 108n by the BPEL run-time engine 110.

Figure 2:
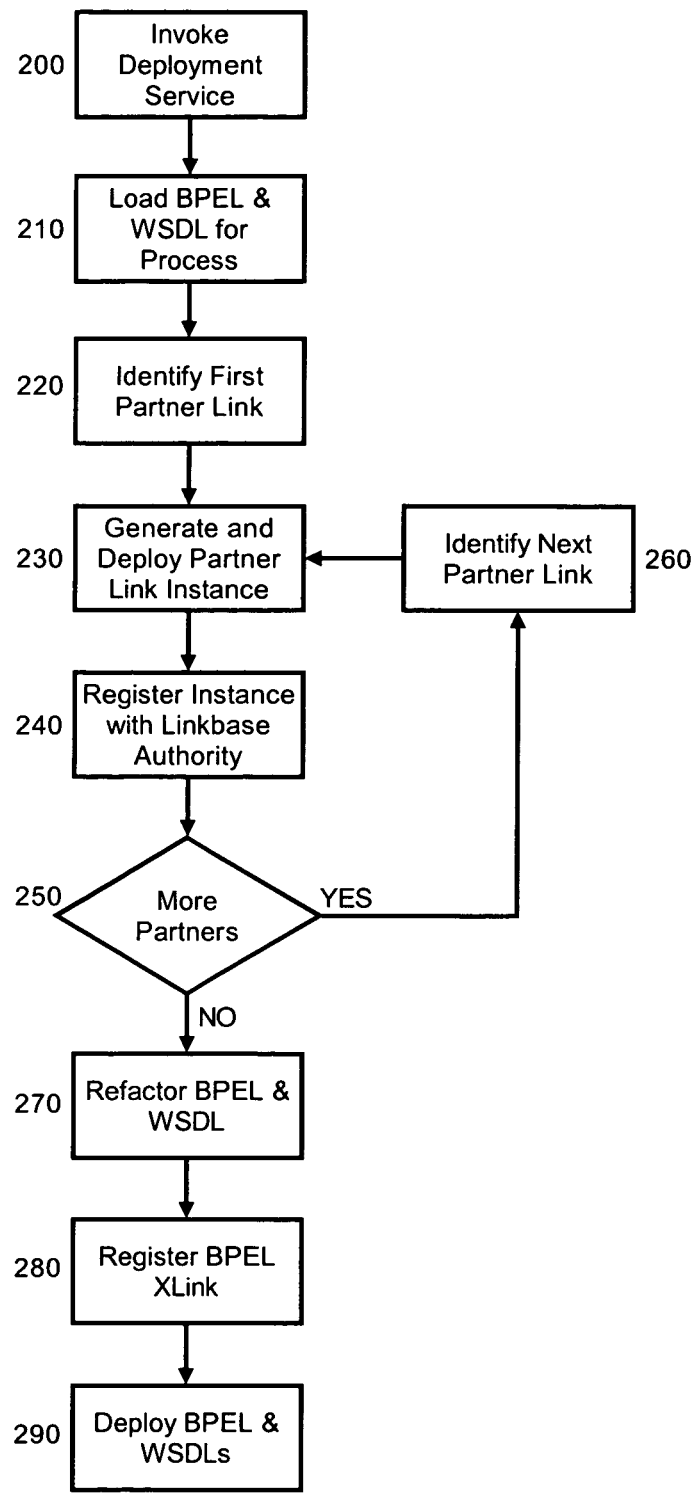
FIG. 2 is a flow chart illustrating a process for deploying partner link services in the system of FIG. 1 to support dynamic binding of partner links to endpoint services.

In further illustration of the foregoing invention, FIG. 2 is a flow chart showing a process for deploying partner link services in the system of FIG. 1 to support dynamic binding of partner links to endpoint services. Beginning in block 200, the deployment service can be invoked. Specifically, the deployment service can be invoked by calling the deploy operation of the BPEL run-time engine and by passing a BPEL document and a companion WSDL document to the deployment service. Additionally, the WSDL documents for the partner links specified in the BPEL document further can be passed to the deployment service.

In block 210, the BPEL document and companion WSDL document can be loaded for processing. In block 220, a first partner link can be identified in the BPEL document. In block 230, a partner link instance can be generated and deployed for the first partner link. Specifically, the WSDL document for the identified partner link can be used to generate a skeleton and a service that reflects the actual interface of a corresponding principal service. The partner link instance can be bound and deployed as a Web service which acts as a proxy for the principal service. An exemplary WSDL fragment follows:

```
<wsdl:service name = "MyPTService">
    <wsdl:port binding="namespace:MyServiceSoapBinding"
    name="MyService">
        <wsdlsoap:address
        location="http://localhost:8080/appserver/MyAuxService"/>
    </wsdl:port>
</wsdl:service>
```

In block 240, the partner link instance can be registered with the link base authority. An exemplary XLink fragment follows:

```
<baseResource id="PRIMARY_SERVICE_AUX"
xlink:type="extended">
    <baseResourceRef xlink:type="locator"
    xlink:href="http://mycompany.com/primary_service_aux"
    xlink:role="PARTNER_LINK_INSTANCE"
    xlink:label="PRIMARY_SERVICE_AUX" />
</baseResource>
```

In particular, the registration of the partner link instance can result in the notification of the partner link instance when its associated endpoint reference to a supporting principal service has changed. In blocks 250 and 260, the process of generating and deploying partner link instances for identified partner links, and also of registering the partner link instances with the link base authority can repeat for each identified partner link in the BPEL document. Subsequently, the process can continue in block 270 through block 290.

Figure 3:
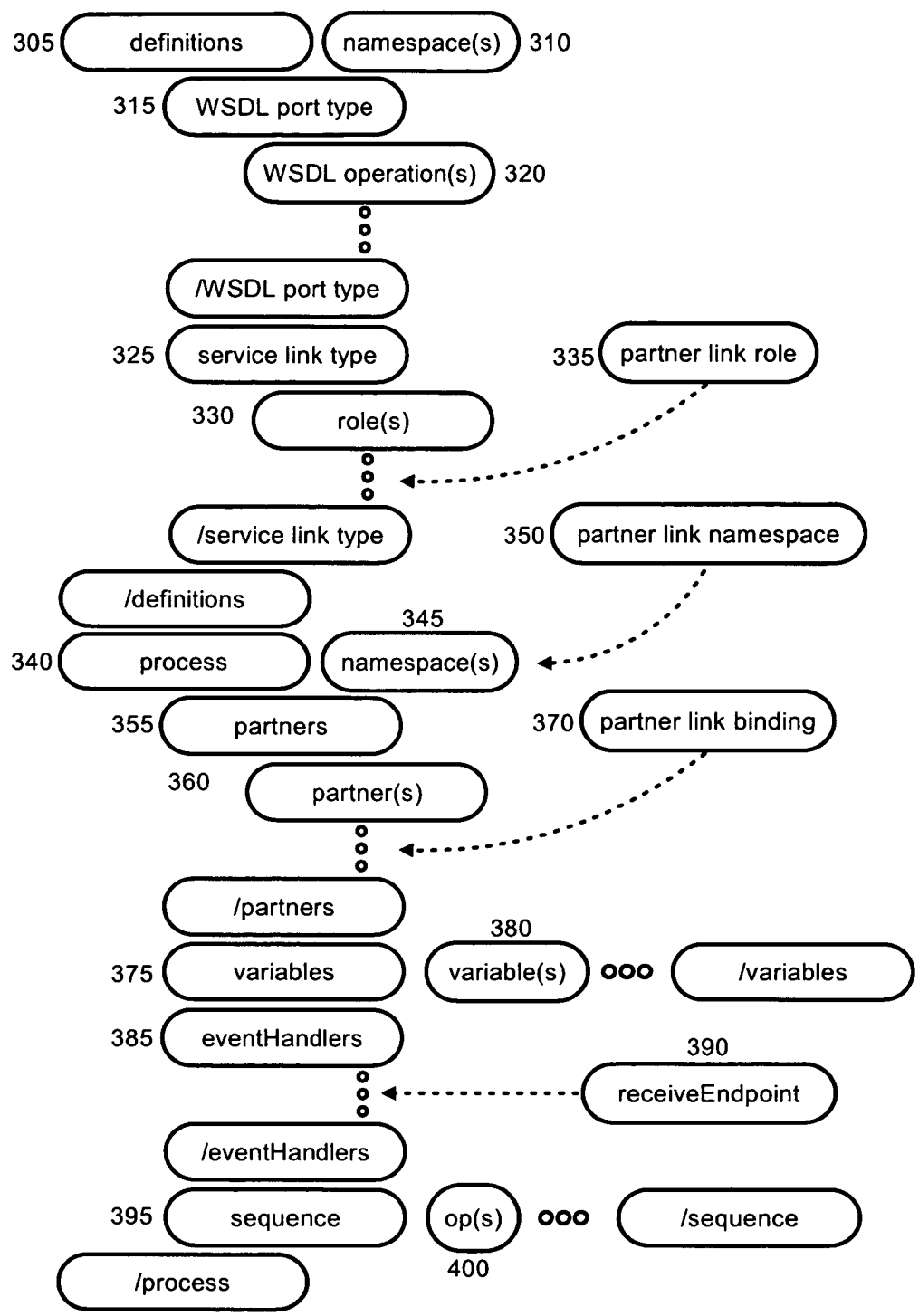
FIG. 3 is a block diagram of a BPEL document configured for modification according to the deployment process of FIG. 2; and, FIG. 4 is a flow chart illustrating a process for dynamically binding a partner link to an endpoint reference.

In particular, in block 270 the BPEL document and the WSDL document for the business process can be re-factored. More particularly, each partner link specified in the BPEL document can be changed to reflect a correspondence to the partner link instance created and deployed in block 230. In more particular illustration, FIG. 3 is a block diagram of a BPEL document configured for modification according to the deployment process of FIG. 2. The BPEL document illustrated in FIG. 3 can include a definitions portion 305 in which a namespace 310 can be defined, a WSDL port type 315 having one or more defined WSDL operations 320 can be defined, and a service link type 325 having one or more roles 330 can be defined.

Notably, a process portion 340 can be included in the BPEL document. The process portion 340 can specify one or more namespaces 345 and can incorporate a partners section 355 having one or more defined partner links 360, a variables 375 section having one or more defined variables 380, and a sequence section 395 having one or more operations 400 defined therein. During the re-factoring process of the present invention, a reference to partner link instance 335 can be added to the BPEL document as can a partner link instance namespace definition 350 for the namespace of the partner link instance 335. A binding 370 to the WSDL document for the partner link instance 335 further can be added to the partners section 355 of the BPEL document. Finally, an event handling section 385 can be added in which an event 390 can be defined for handling a change in reference endpoint to a principal service.

Returning now to FIG. 2, in block 280, the XLinks for the business process defined in the BPEL document can be registered with the link base authority. In this regard, an XLink stored in the link base authority can bind the partner link role to the principal service along with the partner link instance to a partner link. If a partner link is mapped to a new principal service, then the partner link instance that is mapped to a specific partner link can be updated with a new endpoint address. Finally, in block 290 the re-factored BPEL document and the refactored WSDL document can be deployed for use by the BPEL run-time engine.

Figure 4:
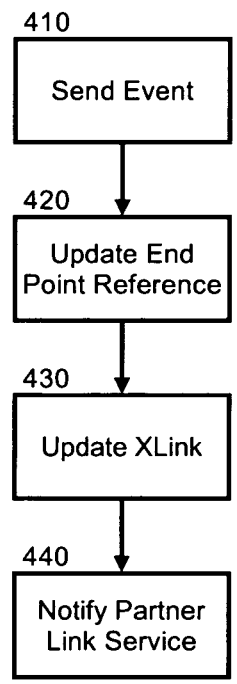

Once the re-factored BPEL document has been deployed along with the requisite WSDL documents, the endpoint address for a principal service can be changed dynamically without first unloading the configuration of the business process defined by the BPEL document. Specifically, FIG. 4 is a flow chart illustrating a process for dynamically binding a partner link to an endpoint reference. Beginning in block 410, an event can be posted for binding a principal service to a designated partner link instance. An exemplary event formatted as a SOAP message follows:

```
<?xml version "1.0" encoding="UTF-8"?>
<soapenv:Envelope xmlns:soapenv=" " xmlns:xsd=" " xmlns:xsi=" ">
    <soapenv:Header>
        <wsa:To xmlsn:wsa="http://schemas.xmlsoap.org/.../soap-envelope">
            http://localhost:8080/appserver/services/PrincipalSupplierService
        </wsa:To>
        <wsa:ReplyTo xmlsn:wsa="http://schemas.xmlsoap.org/.../soap-envelope">
            http://localhost:8080/appserver/services/SecondarySupplierService
        </wsa:ReplyTo>
    </soapenv:Header>
    <soapenv:Body>
        <event xmlns=" ">
            <partner>Supplier</partner>
        </event>
    </soapenv:Body>
</soapenv:Envelope>
```

In block 420, the principal service to which the specified partner link has been correlated in the event can be updated with the secondary service also specified within the event. In block 430, the XLink in the link base authority can be updated to reflect the secondary service endpoint address. In consequence of updating the XLink, each partner link instance corresponding to the partner link in the link base authority can be notified of the change endpoint event. Finally, in block 440, the event handler defined in the BPEL for the process can notify each registered partner link instance of the new endpoint address and any outgoing service call can be modified accordingly.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention cab be embodied in other specific forms without departing from the spirit or essential attributes thereof, and accordingly, reference should be had to the following claims, rather than to the foregoing specification, as indicating the scope of the invention.

We claim:

1. A cross-enterprise business process management hardware system comprising:

a business process specification document processor configured to process business process specification documents, each of said documents defining a business process;

a deployment service coupled to said processor and programmed to generate and deploy partner link instances for corresponding partner links specified in said documents; and, a link base authority configured to notify each partner link instance when an endpoint reference to a principal service has changed.

2. The system of claim 1, wherein said business process specification documents comprise business process execution language (BPEL) documents.

3. The system of claim 2, wherein said business process specification document processor comprises a business process execution language for Web services (BPEL4WS) runtime processor.

4. The system of claim 1, wherein said business process comprises a sequence of business activities embodied within corresponding Web services.

5. The system of claim 4, wherein each of said partner link instances comprises a Web service encapsulating a partner link instance and acting as a proxy to a corresponding principal service.

6. A method for dynamically binding principal services to partner links in a cross-enterprise business process management system, the method comprising the steps of:

deploying a partner link instance for each partner link specified in a business process specification document;

re-factoring said document to bind each said partner link to each said deployed partner link instance in lieu of a direct binding to a principal service;

adding an event handler to said business process specification document to handle a dynamic change to an endpoint reference to said principal service; and, registering each of said partner link instances to receive notification of a change to an endpoint reference to a principal service.

7. The method of claim 6, wherein said deploying step further comprises the step of deploying each said partner link instance as a Web service proxy to a corresponding principal service.

8. The method of claim 7, wherein said re-factoring step comprises the steps of:

modifying said business process specification document to bind each said partner link to each said deployed partner link instance in lieu of a direct binding to a principal service; and, further modifying a companion Web services definition language (WSDL) document for said business process specification document to reference said event handler.

9. The method of claim 6, wherein said registering step comprises the step of registering an XLink for each said partner link in a link base authority.

10. The method of claim 6, further comprising the steps of:
invoking said event handler;
changing an endpoint reference to a principal service bound to a deployed partner link instance;
notifying said deployed partner link instance that a change to said endpoint reference has occurred; and,
modifying subsequent service calls to said principal service to reflect said changed endpoint reference.

* * * * *